(12) United States Patent
Kim et al.

(10) Patent No.: US 12,741,239 B2
(45) Date of Patent: Sep. 22, 2026

(54) APPARATUS AND METHOD FOR PROCESSING SUBSTRATE

(71) Applicant: SEMES CO., LTD., Chungcheongnam-do (KR)

(72) Inventors: Seong Hyeon Kim, Chungcheongnam-do (KR); Gi Hun Choi, Gyeongsangnam-do (KR); Seung Tae Yang, Gyeonggi-do (KR); So Young Park, Gyeongsangnam-do (KR); Kyung Hwan Min, Chungcheongnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 937 days.

(21) Appl. No.: 17/941,018

(22) Filed: Sep. 9, 2022

(65) Prior Publication Data

US 2023/0211261 A1 Jul. 6, 2023

(30) Foreign Application Priority Data

Dec. 30, 2021 (KR) ........................ 10-2021-0192106

(51) Int. Cl.
*B01D 29/66* (2006.01)
*B01D 29/90* (2006.01)
(Continued)

(52) U.S. Cl.
CPC ........... *B01D 29/668* (2013.01); *B01D 29/90* (2013.01); *B01D 29/94* (2013.01); *B08B 3/02* (2013.01); *B08B 15/00* (2013.01)

(58) Field of Classification Search
CPC ...... B01D 29/668; B01D 29/90; B01D 29/94; B08B 3/02; B08B 15/00; H01L 21/6715;
(Continued)

(56) References Cited

U.S. PATENT DOCUMENTS 10,037,901 B2 7/2018 Koyama et al.
11,260,436 B2 3/2022 Osada et al.
2021/0398828 A1* 12/2021 Kosai ...................... B08B 13/00

FOREIGN PATENT DOCUMENTS

JP 2007-266211 10/2007
JP 2015-204302 11/2015
(Continued)

OTHER PUBLICATIONS

Translation of Osada (Year: 2020).*
(Continued)

*Primary Examiner* — Ekandra S. Miller-Cruz
(74) *Attorney, Agent, or Firm* — WOMBLE BOND DICKINSON (US) LLP

(57) ABSTRACT

The present disclosure provides a substrate processing apparatus capable of stabilizing the particle level when re-supplying a chemical solution. The substrate processing apparatus includes a circulation line connected to a chemical supply unit to circulate a chemical solution, a filter installed in the circulation line to filter particles in the chemical solution, a supply line connected to a first node of the circulation line and configured to supply the chemical solution to the chamber, and a drain line connected, in the circulation line, to a second node located between the filter and the first node, and configured to drain the chemical solution, the apparatus being configured to operate, during a first duration, from when a pump of the chemical supply unit is restarted after the pump had stopped, to drain the chemical solution that passes through the filter.

16 Claims, 10 Drawing Sheets

(51) Int. Cl.
*B01D 29/94* (2006.01)
*B08B 3/02* (2006.01)
*B08B 15/00* (2006.01)

(58) Field of Classification Search
CPC ............. H01L 21/67017; B05B 15/555; B05C 11/1002
USPC ........................................................ 210/253
See application file for complete search history.

(56) References Cited

FOREIGN PATENT DOCUMENTS

| | | |
|---|---|---|
| JP | 2015-220374 | 12/2015 |
| JP | 2016-103590 | 6/2016 |
| JP | 2021-52038 | 4/2021 |
| KR | 10-2007-0007450 | 1/2007 |
| KR | 10-2015-0131968 | 11/2015 |
| KR | 10-2020-0044753 | 4/2020 |
| KR | 10-2021-0158330 | 12/2021 |

OTHER PUBLICATIONS

Translation of Yamaguchi (JP 2021-52038) (Year: 2021).*
Office Action dated Aug. 21, 2023 for Korean Patent Application No. 10-2021-0192106 and its English translation from Google Translate.
Office Action dated Jul. 4, 2023 for Japanese Patent Application No. 2022-148775 and its English translation from Global Dossier.

* cited by examiner

APPARATUS AND METHOD FOR PROCESSING SUBSTRATE

CROSS-REFERENCE TO RELATED APPLICATION

This application claims priority from Korean Patent Application No. 10-2021-0192106 filed on Dec. 30, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to an apparatus and a method for processing a substrate.

2. Description of the Related Art

Manufacturing a semiconductor device or a display device involves the use of various types of chemical solutions. These chemical solutions are adjusted to suit process conditions such as concentration, temperature, and flow rate through the chemical solution supply unit, and are supplied to a chamber for processing the substrate. In the meantime, with an intermittent supply of the chemical solution involving a pause between supply and resupply of the solution from the chemical supply unit to the chamber, it takes a lot of time to stabilize the particle level in the solution.

SUMMARY

Aspects of the present disclosure provide a substrate processing apparatus capable of rapidly stabilizing the particle level when a chemical solution is re-supplied.

Another aspect of the present disclosure provides a substrate processing method capable of rapidly stabilizing the particle level when a chemical solution is re-supplied.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided an apparatus for processing a substrate, including a circulation line, a filter, a supply line, and a drain line. The circulation line is connected to a chemical supply unit to circulate a chemical solution. The filter is installed in the circulation line to filter particles in the chemical solution. The supply line is connected to a first node of the circulation line and configured to supply the chemical solution to the chamber. The drain line is connected, in the circulation line, to a second node located between the filter and the first node, and configured to drain the chemical solution.

According to another aspect of the present disclosure, there is provided an apparatus for processing a substrate, including a circulation line, a filter, a supply line, a drain line, a first on-off valve, a second on-off valve. The circulation line is connected to a chemical supply unit to circulate a chemical solution. The filter is installed in the circulation line to filter particles in the chemical solution. The supply line is connected to a first node of the circulation line and configured to supply the chemical solution to the chamber. The drain line is connected, in the circulation line, to a second node located between the filter and the first node, and configured to drain the chemical solution. The first on-off valve is positioned in the circulation line between the first node and the second node. The second on-off valve is installed in the drain line. Here, the apparatus is configured to operate, during a first duration, to turn off the first on-off valve and turn on the second on-off valve, the apparatus is configured to operate, during a second duration after the first duration, to turn on the first on-off valve and maintain the second on-off valve turned on, and the apparatus is configured to operate, during a third duration after the second duration, to turn on the second on-off valve and maintain the first on-off valve turned on.

According to yet another aspect of the present disclosure, there is provided a method of processing a substrate, including providing an apparatus for processing a substrate, including a circulation line connected to a chemical supply unit, a filter installed in the circulation line, a supply line connected to a first node of the circulation line, a a drain line connected in the circulation line to a second node located between the filter and the first node, performing, during a first duration, to drain a chemical solution that passes through the filter, through the drain line, performing, during a second duration after the first duration, to drain a portion of the chemical solution that passes through the filter, through the drain line and to supply some other portion of the chemical solution through the supply line to the chamber, and performing, during a third duration after the second duration, to not drain the chemical solution that passes through the filter but to supply the chemical solution through the supply line to the chamber.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
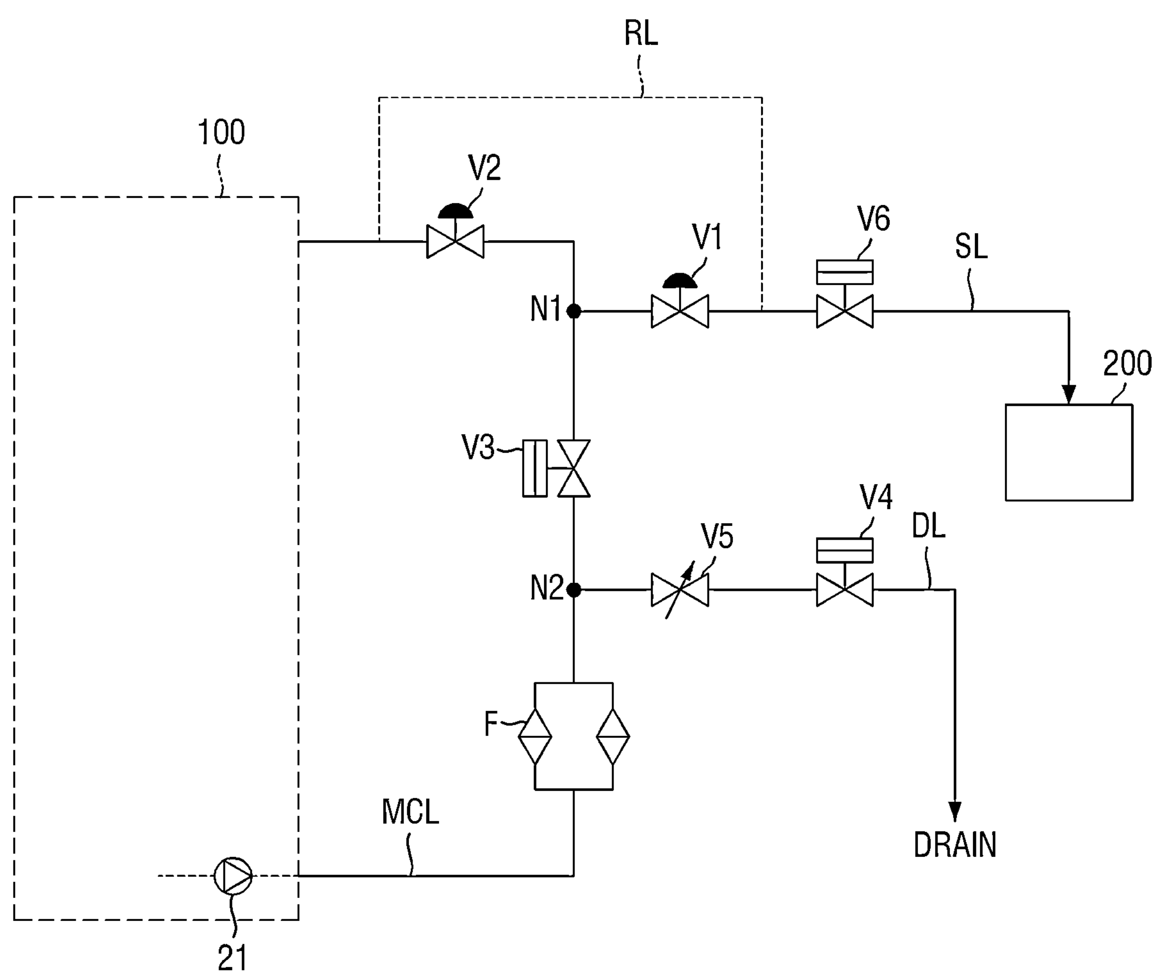
FIG. 1 is a diagram for explaining a substrate processing apparatus according to some embodiments of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like reference numerals refer to like elements throughout the specification.

Spatially relative terms, such as “below,” “beneath,” “lower,” “above,” “upper,” and the like, may be used herein for ease of description to convey one element’s or feature’s relationship to another element(s) or feature(s) as illustrated in the drawings. It will be understood that the spatially relative terms are intended to encompass different orientations of the device in use or operation in addition to the orientation depicted in the drawings. For example, when a device in the drawings is turned over, elements described as “below” or “beneath” other elements or features would then be oriented “above” the other elements or features. Thus, the illustrative term “below” can encompass both an orientation of above and below. The device may be otherwise oriented (rotated 90 degrees or at other orientations), and the spatially relative descriptors used herein may be interpreted accordingly.

It will be understood that, although the terms first, second, etc. may be used herein to describe various elements, components, and/or sections, these elements, components, and/or sections should not be limited by these terms. These terms are only used to distinguish one element, component, or section from another element, component, or section. Thus, a first element, first component, or first section discussed below could be termed a second element, second component, or second section without departing from the teachings of the present disclosure.

Hereinafter, embodiments of the present disclosure will be described in detail with reference to the accompanying drawings, in which the same or corresponding components are assigned the same reference numerals across the drawing numbers and redundancy thereof will be removed.

FIG. 1 is a diagram for explaining a substrate processing apparatus according to some embodiments of the present disclosure.

Referring to FIG. 1, a substrate processing apparatus according to some embodiments of the present disclosure includes a chemical supply unit 100, a circulation line MCL, a supply line SL, a drain line DL, and others.

The circulation line MCL is connected to the chemical supply unit 100 and constitutes a line for circulating the chemical solution.

At least one filter F is installed in the circulation line MCL and filters the particles in the chemical solution. The filter may be, for example, a membrane filter. The membrane filter may be one with a reverse osmosis RO, nano filtration NF, ultra filtration UF, or the like, but is not limited thereto. Depending on the type of membrane filter, the size of particles that can be filtered varies.

The supply line SL is connected to a first node N1 of the circulation line MCL and constitutes a line for supplying the chemical solution to a chamber 200.

The chamber 200 may be a cleaning chamber for performing a cleaning process but is not limited thereto. The chemical solution used in the cleaning process may be, for example, an acidic chemical, an alkaline chemical, ozone water, pure water, isopropyl alcohol (IPA), and the like, but is not limited thereto. However, this embodiment is not limited to the cleaning process, and as long as it does not conflict with the technical idea of the present disclosure, this embodiment can be applied to various processes that utilize a chemical solution. As another example, the chamber 200 may be a chamber for a drying process or an etching process. Additionally, when the chamber 200 is configured as a chamber for a drying process or an etching process, the chemical solution may be a drying liquid or an etchant for use as a treatment liquid.

The drain line DL is connected to a second node N2 of the circulation line MCL and adapted to drain the chemical solution. The second node N2 is located between the first node N1 and the filter F.

A first on-off valve V3 is provided between the first node N1 and the second node N2, and it determines whether to supply the chemical solution to the supply line SL. When the first on-off valve V3 is in the on state, the chemical solution passing through the first on-off valve V3 may be supplied through the supply line SL to the chamber 200 or returned through the circulation line MCL to the chemical supply unit 100.

A second on-off valve V4 is installed in the drain line DL and determines whether to drain the chemical solution. So, when the second on-off valve V4 is in the on state, the chemical solution passing through the second on-off valve V4 is drained.

A flow rate control valve V5 is installed in the drain line DL, and it may adjust the flow rate of the chemical solution to be drained.

A third on-off valve V6 is installed in the supply line SL and determines whether to supply a discharge of the chemical solution to the corresponding chamber 200. In particular, when the third on-off valve V6 is in the on state, the chemical solution passing through the third on-off valve V6 is discharged to the corresponding chamber 200.

A positive pressure valve V1 is installed in the supply line SL and maintains a constant rear-end pressure of the positive pressure valve V1. In this manner, the positive pressure valve V1 may control the chemical solution to be discharged at a constant flow rate in the chamber 200.

A back pressure valve V2 is installed downstream of the first node N1 in the circulation line MCL and maintains the front-end pressure of the back pressure valve V2 to be constant. In this manner, the back pressure valve V2 may keep the pressure constant in the circulation line MCL.

Additionally, a return line RL is provided to interconnect the supply line SL and the circulation line MCL. When the third on-off valve V6 is in the off state, the chemical solution introduced into the supply line SL returns to the circulation line MCL through the return line RL. Alternatively, even when the third on-off valve V6 is in the on state, if the flow rate of the chemical solution introduced into the supply line SL is greater than the flow rate of the chemical solution discharged to the chamber 200, the surplus chemical solution may return to the supply line SL through the return line RL.

The following refers to FIGS. 2 to 5 for explaining a substrate processing method according to some embodiments of the present disclosure.

Figure 2:
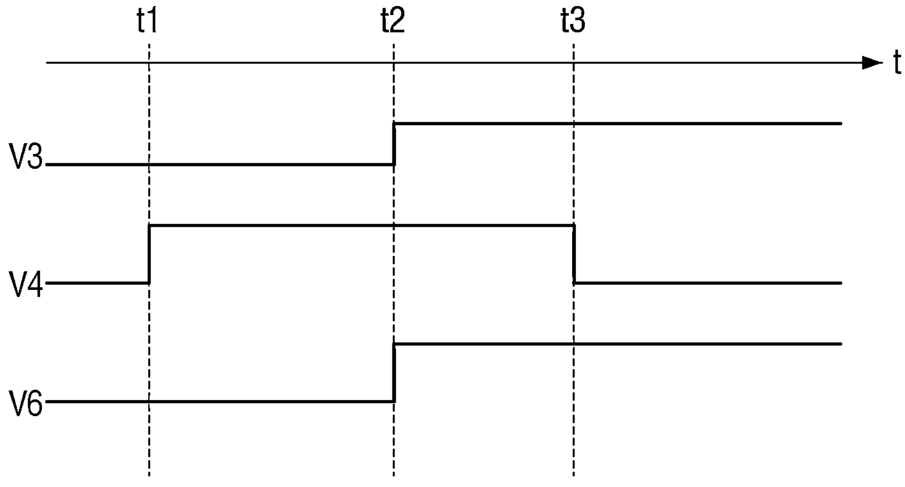
FIG. 2 is a timing diagram for explaining a substrate processing method according to some embodiments of the present disclosure.
Figure 3:
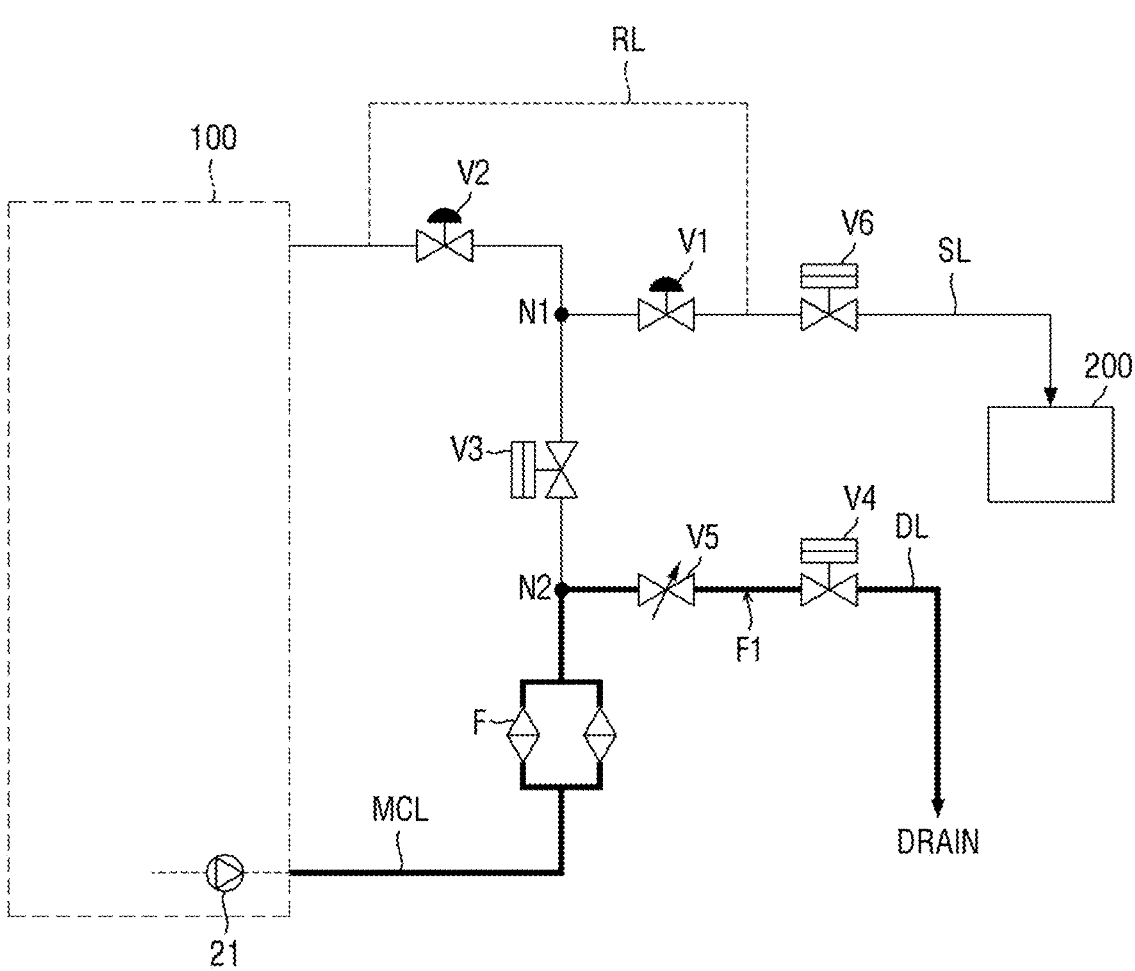
FIGS. 3 to 5 illustrate intermediate steps of the substrate processing method of FIG. 2.
Figure 4:
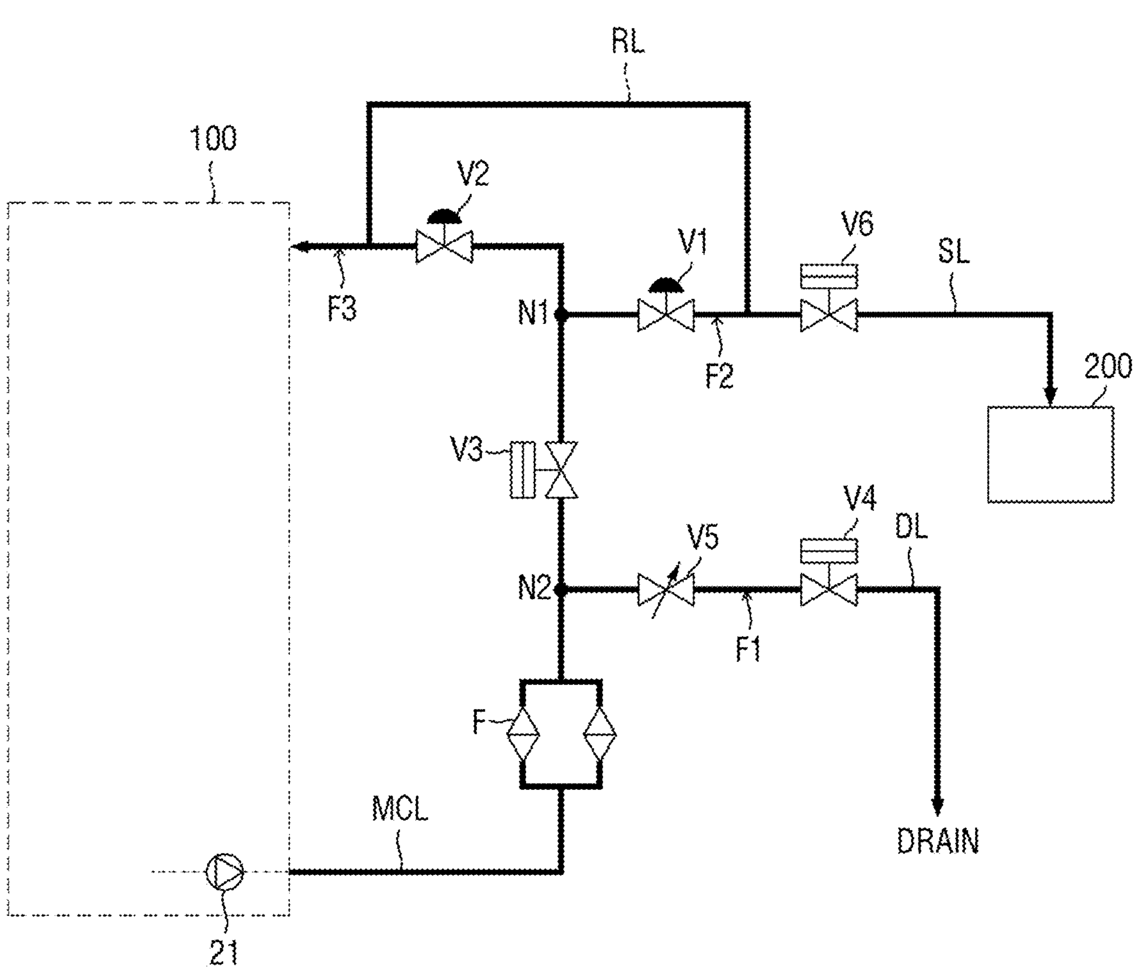
Figure 5:
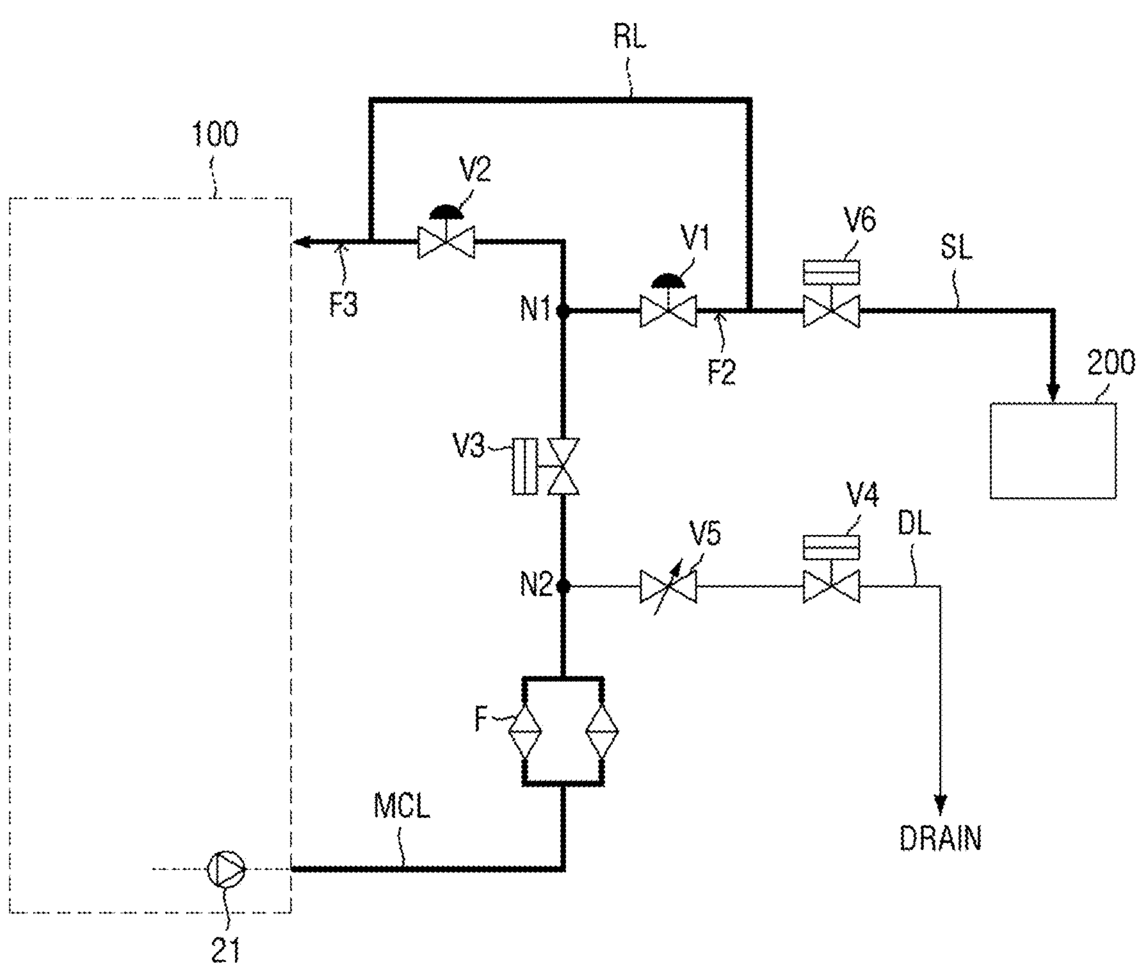

FIG. 2 is a timing diagram for explaining a substrate processing method according to some embodiments of the present disclosure. FIGS. 3 to 5 illustrate intermediate steps of the substrate processing method of FIG. 2.

Referring to FIGS. 2 and 3, the second on-off valve V4 is turned on at time t1.

In time t1 to t2 (i.e., a first duration), the first on-off valve V3 and the third on-off valve V6 are in their off states, and the second on-off valve V4 is in the on state, which causes the chemical solution that has passed through the filter F to be drained through the drain line DL as indicated by reference numeral F1.

Referring to FIGS. 2 and 4, the first on-off valve V3 and the third on-off valve V6 are turned on at time t2. The second on-off valve V4 maintains an on state.

In time t2 to t3 (i.e., a second duration), since the first to third on-off valves V3, V4, and V6 are in an on state, a part of the chemical solution that has passed through the filter F may be drained as indicated by F1, some other part may be supplied to the chamber 200 through the supply line SL as indicated by F2, and the remaining part may be returned to the chemical supply unit 100 through the circulation line MCL as indicated by F3. Additionally, as shown, some of the chemical solution introduced into the supply line SL may return to the circulation line MCL through the return line RL.

Referring to FIGS. 2 and 5, the second on-off valve V4 is turned off at time t3. The first on-off valve V3 and the third on-off valve V6 maintain an on state.

After time t3 (i.e., in a third duration), since the second on-off valve V4 is in the off state, the chemical solution passing through the filter F is no longer drained. The chemical solution passing through the filter F is supplied to the chamber 200 through the supply line SL as indicated by F2 or returned to the chemical supply unit 100 through the circulation line MCL as indicated by F3.

Figure 6:
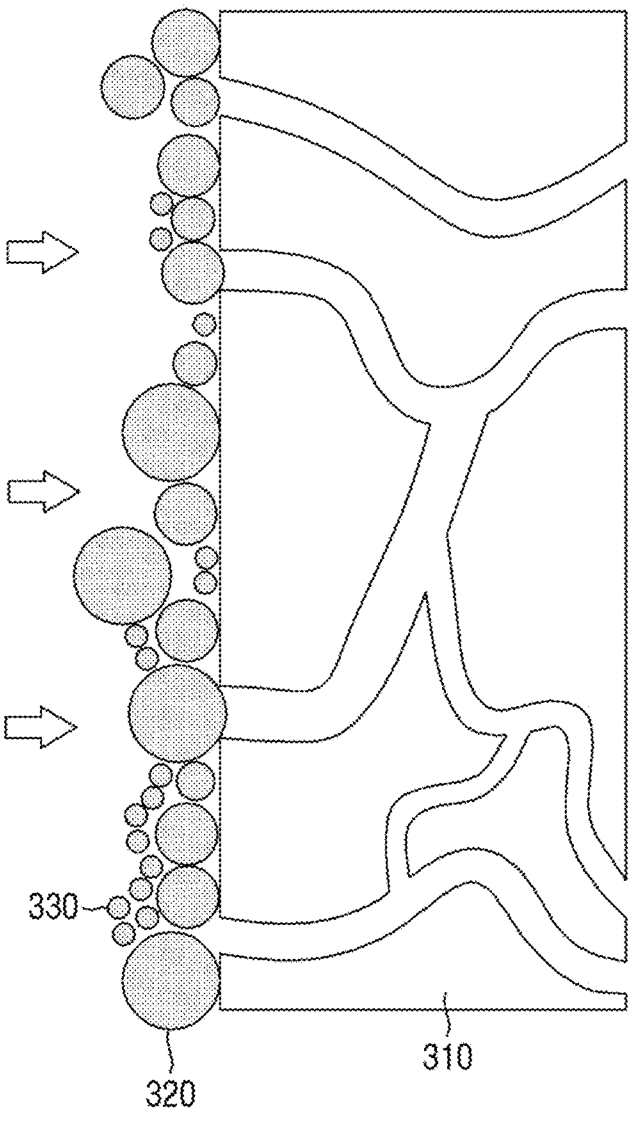
FIG. 6 illustrates a state when the filter pressure is maintained in a filter.
Figure 7:
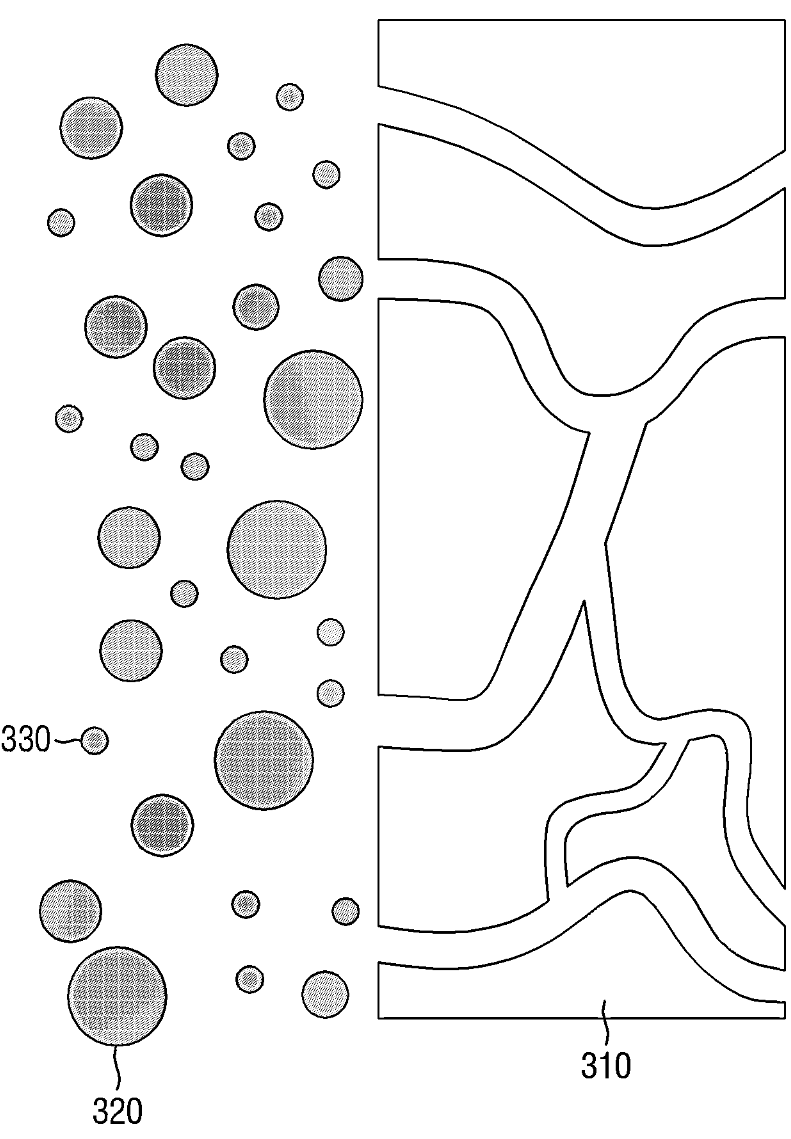
FIG. 7 illustrates a state when the filter pressure in the filter is released.
Figure 8:
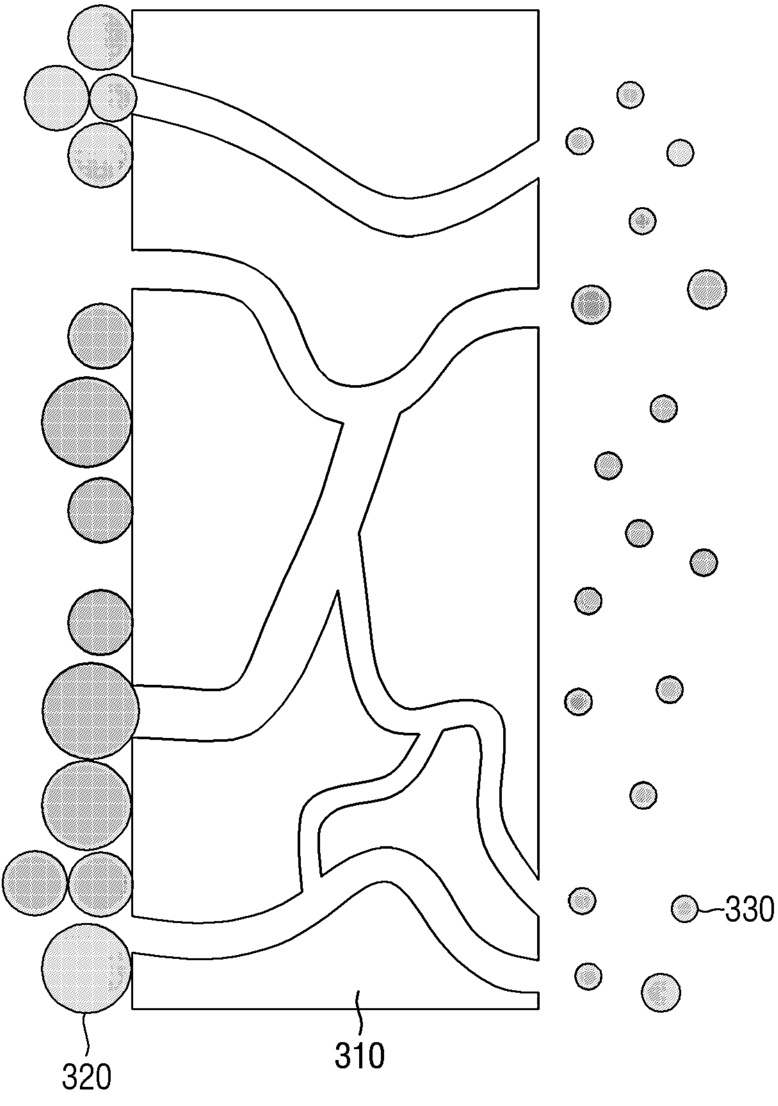
FIG. 8 illustrates a state when pressure is re-generated in the filter.

The following describes the reasoning for draining in an above-described manner with reference to FIGS. 6 to 8. FIG. 6 illustrates a state when the filter pressure is maintained in the filter. FIG. 7 illustrates a state when the filter pressure in the filter is released. FIG. 8 illustrates a state when pressure is re-generated in the filter.

Referring to FIG. 6, a filter pressure is applied to the filter F in one direction as indicated by the arrows shown. The chemical supply unit 100 has a pump 21 (FIG. 1) that transfers the chemical solution in one direction through the circulation line MCL, which causes filter pressure to be generated in one direction in the filter F at its membrane 310.

By this filter pressure, various sizes of particles 320 and 330 congregate on the surface of the membrane 310 to form a cake. The cake thus formed even prevents small-sized particles (i.e., fine particles) 330 from passing through the membrane 310. This represents a favorable condition that a cake formation on the membrane 310 of the filter F allows the filtering operation to be efficiently performed.

Referring to FIG. 7, the filter pressure applied to the filter F is released. For example, the pump 21 may be stopped due to equipment modification, maintenance, or the like. In such a case, the particles 320 and 330 forming the cake on the surface of the membrane 310 are dispersed or dissolved.

Referring to FIG. 8, the filter pressure is regenerated in the filter F. For example, upon completion of the equipment modification, maintenance, or the like, the pump 21 may be restarted. However, for a fourth duration from the time when the filter pressure is regenerated, the cake may not yet be fully made on the membrane 310 of the filter F. This may get the large-sized particles 320 caught on the surface of the membrane 310 while leaving the small-sized particles 330 pass through the membrane 310.

As the large-sized particles 320 are sufficiently accumulated on the surface of the membrane 310, the medium-sized particles are accumulated on top of the particles 320 or fill the space between the particles 320. Thereafter, the small-sized particles 330 are piled up on the particles 320 or fill the space between the particles 320, completing the cake formation.

In summary, for the fourth duration from the time when the filter pressure is regenerated, no cake is formed on the membrane 310, and the cake is re-formed on the membrane 310 only after the fourth duration.

Referring back to FIGS. 2 and 3, before time t1, no filter pressure is applied to the filter F. This holds the pump 21 of the chemical supply unit 100 from operating. By this time, no cake is formed by the particles 320 and 330 on the surface of the membrane 310 of the filter F.

From time t1, filter pressure begins to be applied to the filter F. In particular, time t1 may be a time point when (or immediately after or immediately before) the pump 21 of the chemical supply unit 100 is restarted after it had been stopped for reasons such as modification or maintenance. Alternatively, time t1 may be a time point when (or immediately after or immediately before) the chemical supply unit 100 is operated after the initial setup thereof.

For a predetermined time (i.e., the fourth duration described above) from time t1, no cake formation is yet completed on the membrane 310 of the filter F as shown in FIG. 8. For the predetermined time from time t1, the small particles 330 pass through the filter F. The chemical solution that has passed through the filter F contains the small particles 330. Therefore, during time t1 to t2, the second on-off valve V4 maintains an on state, and the chemical solution that has passed through the filter F is not used in the process but drained through the drain line DL as indicated by F1.

From time t2, the first on-off valve V3 and the third on-off valve V6 may also be turned on, and a part of the chemical solution that has passed through the filter F is drained through the drain line DL as indicated by F1, some other part thereof may be supplied to the chamber 200 through the supply line SL as indicated by F2, and the rest of the chemical solution may be returned to the chemical supply unit 100 through the circulation line MCL as indicated by F3.

Since modifications, maintenance, etc., had stopped the pump 21 of the chemical supply unit 100, the supply line SL and/or the circulation line MCL has been emptied for a long time, or the chemical solution has been stagnant. This can affect particle generation.

Accordingly, the present disclosure provides the chemical solution to the supply line SL and/or the circulation line MCL while draining some of the chemical solution. This can prevent the pipe emptying of the supply line SL and/or the circulation line MCL, and prevent stagnation of the chemical solution. This can then remove a particle-generating element that may exist in the supply line SL and/or the circulation line MCL.

The chemical solution supplied to the chamber 200 is not immediately used in the process but is used for nozzle flushing through auto-dispense or the like. This minimizes particle generation.

From time t3, the second on-off valve V4 is turned off to allow no more draining of the chemical solution that has passed through the filter F. With a sufficient time elapsed after time t1 (that is, when the fourth duration described above has elapsed), a cake is formed on the membrane 310 of the filter F to cause even small particles 330 to hardly pass through the membrane 310 with possible particle-generating elements being eliminated from the supply line SL and/or the circulation line MCL. This is the reason for the above timely termination of the draining of the chemical solution.

Meanwhile, during time t1 to t3, a first flow rate of the chemical solution supplied from the chemical supply unit 100 (i.e., the chemical solution passing through the filter F)

is equal to or greater than the sum of a second flow rate of the chemical solution drained through the drain line DL and a third flow rate of the chemical solution supplied through the supply line SL to the chamber 200.

For example, during time t1 to t2, the third flow rate of the chemical solution supplied through the supply line SL to the chamber 200 is substantially zero. Accordingly, the first flow rate of the chemical solution supplied from the chemical supply unit 100 is equal to or greater than the second flow rate of the chemical solution drained through the drain line DL. When there is no lost chemical solution in the filter F, the first flow rate is equal to the second flow rate, and when the chemical solution lost in the filter F occurs, the first flow rate is greater than the second flow rate. Consequently, the first flow rate is greater than or equal to the sum of the second flow rate and the third flow rate.

During time t2 to t3, the chemical solution supplied from the chemical supply unit 100 is distributed to the drain line DL, the supply line SL, and the circulation line MCL. Accordingly, the first flow rate is greater than the sum of the second flow rate and the third flow rate.

Figure 9:
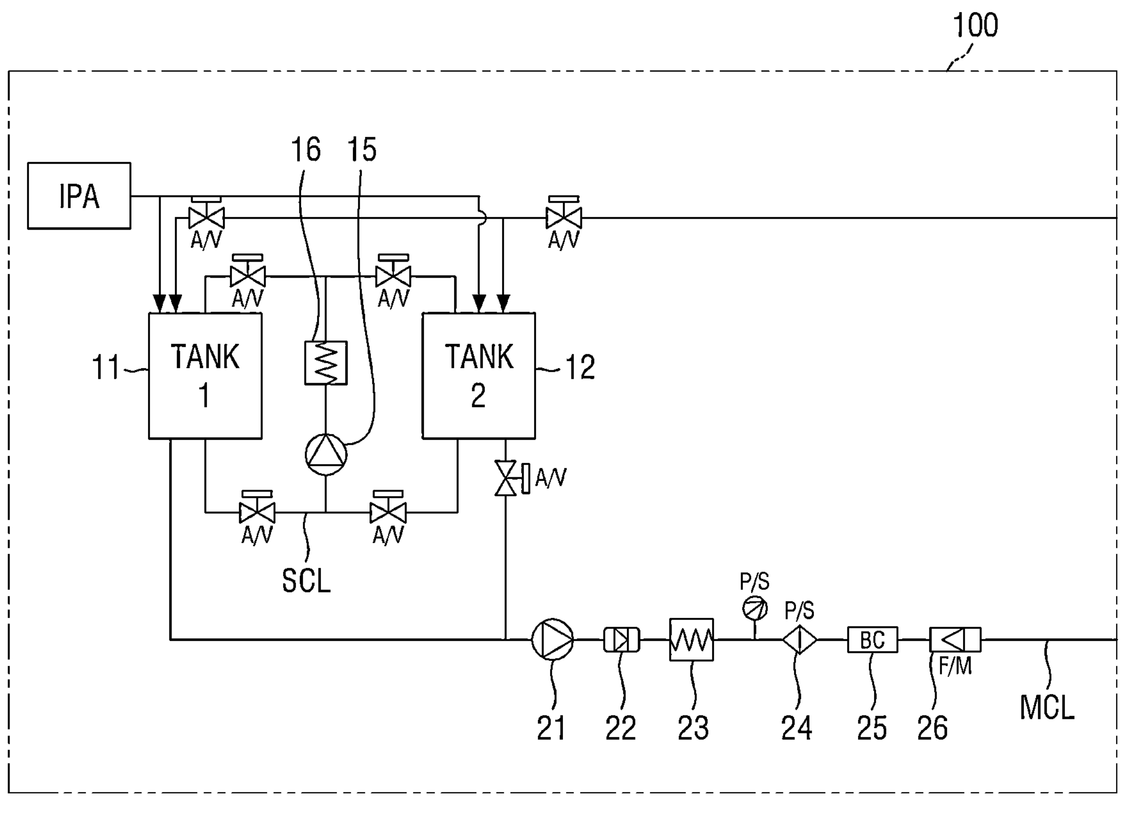
FIG. 9 is a diagram of an example configuration of the chemical supply unit shown in FIG. 1.

FIG. 9 is a diagram of an example configuration of the chemical supply unit 100 shown in FIG. 1.

Referring to FIG. 9, the chemical supply unit 100 may be provided with tanks 11 and 12 one or more each. Referring to FIG. 1 by way of example, two tanks 11 plus two tanks 12 may be provided.

Tanks 11 and 12 may have a small circulation line SCL and a circulation line (or main circulation line) MCL connected thereto.

The small circulation line SCL may be installed with a pump 15 and a heater 16. The chemical solution in the tanks 11 and 12 may be adjusted to the target temperature by the heater 16 while circulating the small circulation line SCL. Depending on the operation of the valves illustrated, the chemical solution from the tank (e.g., 11) may be returned to the tank 11 through the heater 16, or may be supplied to another tank (e.g., 12).

The circulation line MCL may be connected to the return line RL, the supply line SL, and the drain line DL, as described with reference to FIG. 1.

The circulation line MCL may be provided with various components for controlling the temperature and flow rate of the chemical solution supplied to the chamber 200. For example, the circulation line MCL may be provided with a pump (or main pump) 21, a damper 22, a main heater 23, a filter 24, a bubble cutter 25, a flow meter 26, etc.

Figure 10:
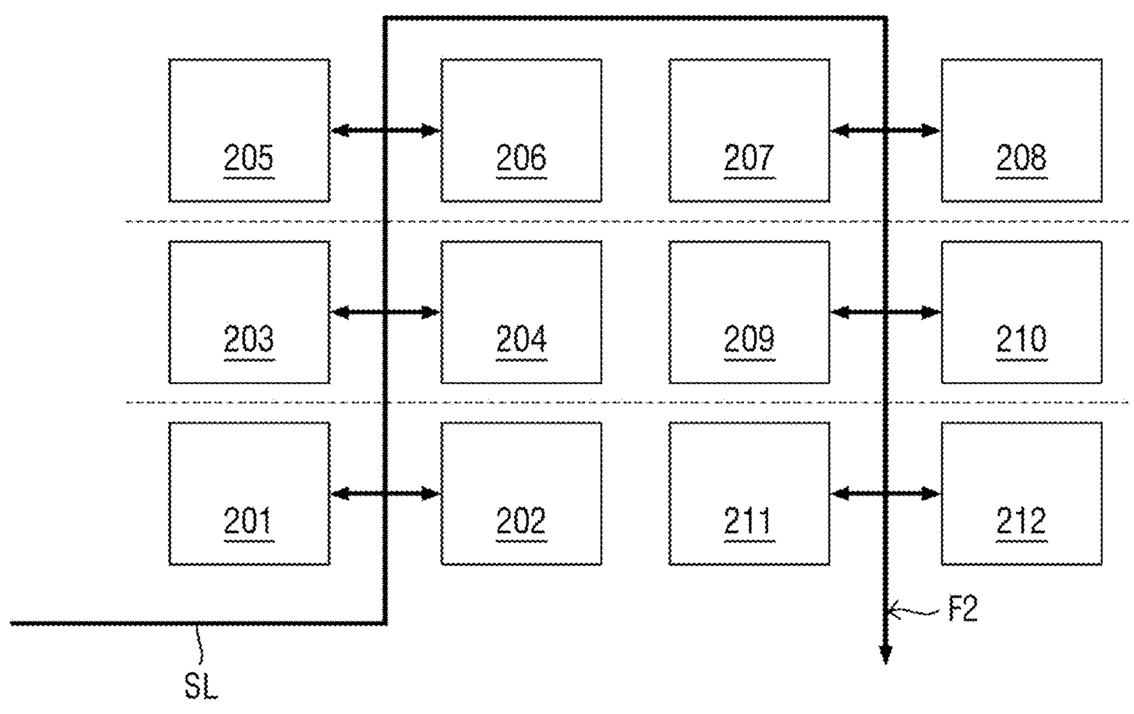
FIG. 10 is a diagram for explaining a substrate processing apparatus according to another embodiment of the present disclosure.

FIG. 10 is a diagram for explaining a substrate processing apparatus according to another embodiment of the present disclosure. For the convenience of explanation, the following focuses on details different from those described with reference to FIGS. 1 to 5.

Referring to FIG. 10, the substrate processing apparatus according to another embodiment of the present disclosure may be installed with a plurality of chambers 201 to 212 to which the chemical solution is supplied through the supply line SL.

The plurality of chambers 201 to 212 may be arranged in multiple layers. As shown, the chambers 201, 202, 211, 212 may be disposed on the lower layer, the chambers 203, 204, 209, 210 may be disposed on the middle layer, and the chambers 205, 206, 207, 208 may be disposed on the upper layer. The supply line SL is installed to supply the chemical solution first to the chambers 201 and 202 in the lower layer, to the chambers 203 and 204 in the middle layer, and to the chambers 205 and 206 in the upper layer. The supply line SL is installed to supply the chemical solution subsequently to the chambers 207 and 208 in the upper layer, to the chambers 209 and 210 in the middle layer, and to the chambers 211 and 212 in the lower layer as indicated by F2.

While a few exemplary embodiments of the present disclosure have been described with reference to the accompanying drawings, those skilled in the art will readily appreciate that various changes in form and details may be made therein without departing from the technical idea and scope of the present disclosure as defined by the following claims. Therefore, it is to be understood that the foregoing is illustrative of the present disclosure in all respects and is not to be construed as limited to the specific exemplary embodiments disclosed.

The invention claimed is:

1. An apparatus for processing a substrate, comprising: a circulation line connected to a chemical supply unit to circulate a chemical solution; a membrane filter installed in the circulation line to filter particles in the chemical solution; a supply line connected to a first node of the circulation line and configured to supply the chemical solution to a chamber; and a drain line connected, in the circulation line, to a second node located between the membrane filter and the first node, and configured to drain the chemical solution; a return line connecting an upstream of the first node at the circulation line and a downstream of the first node at the supply line to return the chemical solution from the supply line to the circulation line; and wherein the apparatus is programmed configured to operate in multiple durations and during a third duration from when a pump of the chemical supply unit is restarted after the pump had stopped, to wait until a cake is formed with particles on a membrane of the membrane filter.

2. The apparatus of claim 1, wherein the chemical solution that is supplied to the chamber during the second duration is used for nozzle flushing.

3. The apparatus of claim 1, wherein the apparatus is configured to operate, during a third duration after the second duration, to not drain the chemical solution that passes through the filter but to supply the chemical solution through the supply line to the chamber.

4. The apparatus of claim 1, wherein the apparatus is configured to operate, during a third duration, from when the chemical supply unit is operated after an initial setup of the chemical supply unit, to drain the chemical solution that passes through the filter.

5. The apparatus of claim 1, wherein the chemical supply unit supplies the chemical solution at a first flow rate, the drain line drains the chemical solution at a second flow rate, the supply line transfers the chemical solution to the chamber at a third flow rate, the first flow rate being equal to or greater than a sum of the second flow rate and the third flow rate.

6. The apparatus of claim 1, further comprising:

an on-off valve positioned between the first node and the second node and configured to further determine whether to supply the chemical solution to the supply line.

7. The apparatus of claim 1, further comprising:

an on-off valve installed on the drain line and configured to determine whether to drain the chemical solution.

8. The apparatus of claim 7, further comprising:

a flow control valve installed on the drain line and configured to control a flow rate of the chemical solution that is drained.

9. The apparatus of claim 1, further comprising:

a back pressure valve positioned downstream of the first node in the circulation line and configured to maintain a front-end pressure of the back pressure valve to be constant.

10. The apparatus of claim 9, further comprising:

a positive pressure valve positioned in the supply line and configured to maintain a constant flow rate of the chemical solution discharged to the chamber by maintaining a rear-end pressure of the positive pressure valve to be constant.

11. An apparatus for processing a substrate, comprising: a circulation line connected to a chemical supply unit to circulate a chemical solution; a membrane filter installed in the circulation line to filter particles in the chemical solution; a supply line connected to a first node of the circulation line and configured to supply the chemical solution to a chamber; a drain line connected, in the circulation line, to a second node located between the membrane filter and the first node, and configured to drain the chemical solution; a first on-off valve positioned in the circulation line between the first node and the second node; and a second on-off valve installed in the drain line; and a return line connecting an upstream of the first node at the circulation line and a downstream of the first node at the supply line to return the chemical solution from the supply line to the circulation line; and wherein the apparatus is programmed configured to operate in multiple durations and a membrane of the membrane filter has no complete formation of a cake due to the particles during a fourth duration, from when a pump of the chemical supply unit is restarted after the pump had stopped.

12. The apparatus of claim 11, wherein the apparatus is configured to operate to drain the chemical solution that passes through the filter, during the first duration, from when a pump of the chemical supply unit is restarted after the pump had stopped, or during the first duration, from when the chemical supply unit is operated after an initial setup of the chemical supply unit.

13. The apparatus of claim 1, further comprising at least two valves provided on the supply line, wherein the return line configured to return the chemical solution from the supply line to the circulation line is connected to between the at least two valves provided on the supply line.

14. The apparatus of claim 11, further comprising at least two valves provided on the supply line, wherein the return line configured to return the chemical solution from the supply line to the circulation line is connected to between the at least two valves provided on the supply line.

15. The apparatus of claim 1, wherein the apparatus is configured to operate, during a first duration, from when a pump of the chemical supply unit is restarted after the pump had stopped, to drain the chemical solution that passes through the filter, and to operate, during a second duration after the first duration, to drain a portion of the chemical solution that passes through the filter and to supply some other portion of the chemical solution through the supply line to the chamber.

16. The apparatus of claim 11, wherein the apparatus is configured to:

operate, during a first duration, to turn off the first on-off valve and turn on the second on-off valve, operate, during a second duration after the first duration, to turn on the first on-off valve and maintain the second on-off valve turned on, and operate, during a third duration after the second duration, to turn on the second on-off valve and maintain the first on-off valve turned on.

* * * * *